March 11, 1947. M. P. GRAHAM 2,417,160
TIE ROD SOCKET BEARING
Filed July 22, 1944
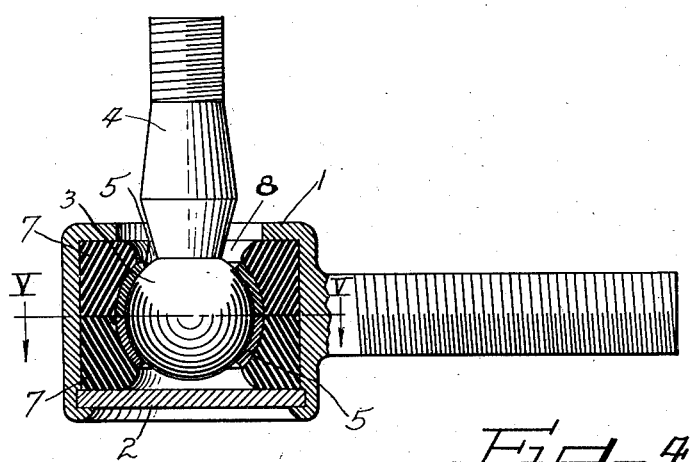
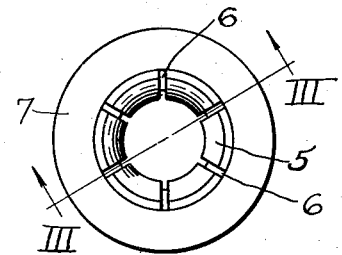
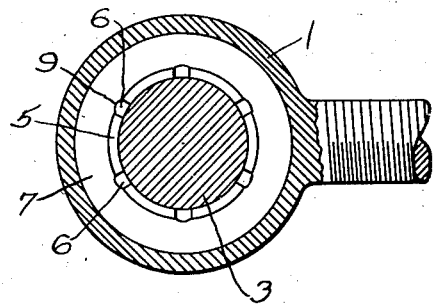
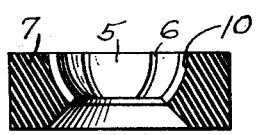
INVENTOR
Matthew P. Graham Patented Mar. 11, 1947

2,417,160

UNITED STATES PATENT OFFICE 2,417,160

TIE ROD SOCKET BEARING

Matthew P. Graham, Detroit, Mich., assignor to Thompson Products, Inc., Cleveland, Ohio, a corporation of Ohio Application July 22, 1944, Serial No. 546,089

4 Claims. (Cl. 287—90)

This invention relates to a universal type joint construction and particularly to a ball joint construction, wherein provision is made to compensate for uneven wear of the bearing surface or liner commonly provided between the movable elements of such joints.

In joints of this type, relative movement of the elements often occurs mainly in one plane, so that the liner wears considerably in opposed areas, while the remainder of the liner wears very little. The provision of a liner divided into two parts with their edges spaced from each other in the assembly of the joints and resiliently urged toward each other to take up the wear is not satisfactory, since the plane of movement may pass through the spaces between the parts of the liner. In that event, the wear would not be compensated for, because compensating movement of the liner parts can take place only in a direction transverse of the plane in which the spaces lie.

By this invention, the possibility of uncompensated wear occurring is prevented by the provision of a bearing liner divided into at least three spaced sections or segments. With this number of sections, there must always be at least one wear take-up space which is not in the plane of greatest wear, so that compensatory movement can occur, and the liner be always maintained in full contact with the ball or other joint member.

It is an object of this invention to provide a universal type joint assembly in which a full bearing contact is always maintained between the relatively movable members.

It is a further object of this invention to provide a ball joint assembly including a loaded resilient bushing secured to at least three spaced segments comprising a bearing liner between the bushing and the ball member.

It is another object of this invention to provide in a joint construction a segmented bearing liner maintained in full contact with a movable joint element by a loaded resilient bushing member.

It is also an object of this invention to provide a bearing for a universal type joint which compensates for wear regardless of localization of the areas of wear.

It is a further object of this invention to provide a resilient bushing for a universal type joint having bearing plates secured thereto and arranged to compensate for wear, so that the plates are always held in full bearing engagement with a movable element of the joint.

Other and further objects and advantages of this invention will be apparent to those skilled in the art from the disclosure made in the following description and the appended drawings.

In the drawings:

Figure 1 is a longitudinal vertical sectional view through a ball joint construction embodying the invention with parts in elevation;

Figure 2 is a plan view of one of the joint bushing elements with the segmental bearing plates bonded in place;

Figure 3 is a vertical sectional view taken on the line III—III of Figure 2 looking in the direction of the arrows;

Figure 4 is a front elevational view of one of the bearing elements of the invention; and Figure 5 is a horizontal sectional view taken on the line V—V of Figure 1 looking in the direction of the arrows.

For the sake of convenience and clearness, the invention is shown and described as embodied in a tie rod end or joint, but it will be understood that the invention is applicable generally to joints having a limited universality of movement.

As shown in Figure 1, the joint assembly comprises a housing 1 defining a socket and a stem. One end of the socket is closed by a closure plate 2. A ball stud has the ball end 3 thereof in the socket and the shank 4 thereof extending through a restricted opening at the end of the socket opposite the closure plate receiving end. A plurality of bearing plates 5 which are curved to fit the surface of the ball 3 are disposed about the ball surface. Each plate 5 is spaced from an adjacent plate, as shown at 6, so that radial movement of the plates towards the ball can take place.

Two annular bushing members 7 of resilient material such as natural or synthetic rubber, or other resilient material, are shown disposed in the socket. These resilient bushings 7 are loaded when assembled in the socket with the other joint elements, so that a portion of the inner annular face of the bushing is bulged or forced as at 8 into a free space between the ball member and the housing. It will be clear that as the bushing 7 is placed under radial load, it is also tensioned circumferentially, so that the material of the bushing tends to draw radially outwardly from the ball member 3, as indicated at 9 in Figure 5.

It will be obvious that instead of two bushing members 7, only one resilient bushing of any desired form might be employed, or that more than two bushing members might be provided. As shown, each of the bushing members 7 has a recess 10 of segmental spherical contour to conform substantially to the surface of the ball member 3. The plates 5 are secured to the segmental spherical face of the recess 10 in spaced relation from each other. The plates constitute a bearing liner for the bushing member 7.

The plates 5 are made of any suitable material, such as a metal or a hard molded plastic, which will provide a smooth, wear-resisting surface for full surface contact with the ball member 3. A synthetic condensation product such as Bakelite or a hard rubber may be used as the material, for example. The sections 5 may be made in any suitable manner, as by molding a segmental spherical liner and then dividing it into the sections or plates, or the plates may be formed individually, as by molding, or in any other desired manner. The plates 5 may be bonded or otherwise secured to the semispherical face of the bushing. If desired, the surface of the recess 10 of the bushing member 7 might be suitably treated to harden the same, and then slotted to a suitable depth to form the spaces 6.

At least three plates 5 are provided on each bushing, so that there will be at least one space 6 in a plane intersecting the plane of greatest wear on the bearing liner. As has been pointed out above, the wear in ball joints and the like is very often concentrated in one plane, so that diametrically opposed areas of the bearing liner are worn to a great extent, while the remainder of the bearing surface is worn but little. This results in undesirable looseness in the joint. The provision of a two-part bearing liner does not avoid the difficulty, because the plane of concentrated wear may pass through the diametrically opposed spaces separating the two parts of the liner. With such a liner, also, there is a tendency for these spaces to work into the plane of greatest wear, due to a sort of camming action of the ball member against the edges of the parts of the liner. The invention is illustrated as embodying a bearing liner composed of six sections, but it will be obvious that more or fewer sections may be provided, so long as there are at least three sections. With this construction, there is always at least one space between sections of the liner which is offset from the plane of greatest wear, so that the parts or sections of the liner may move radially inwardly against the ball member to compensate for the wear, and thus always hold the joint elements in closely fitting relationship. Another advantage of providing a bearing liner of at least three sections is that the liner will conform more exactly to the ball member, as will be obvious.

It will be obvious that the loaded bushing member urges the plates constantly into close contact with the ball member, regardless of where the greatest wear takes place, the plates moving radially inwardly and also circumferentially of the ball member to compensate for the wear. As the bearing plates wear, the loading of the bushing member 7 decreases, so that the plates 5 are maintained against the ball member.

The use of two annular bushing members 7 each with plates 5 secured thereto permits easy assembly of the joint elements. More important, it results in a more positive compensation for wear on the bearing plates, since a plate on one of the bushing members will be urged in the direction of a worn plate on the other bushing member diametrically opposite the first plate. Thus, not only is the worn plate on one bushing urged against the ball member, but an oppositely disposed plate on the other bushing is urged against the ball member and tends to shift the ball member toward the worn plate, so that full contact is maintained between the ball member and the plates, and the effect of wear on the plates is fully overcome.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a socket bearing especially adapted for use with a tie rod of the type including a housing defining a socket at the end of a stem and a ball stud having a ball-like portion located within the socket and with the shank of the stud extending beyond the socket, a pair of similar bushings of resilient material cooperatively related and dimensioned to be placed under compressive load within the housing, said bushings having semi-spherical surfaces generally conformable with and adapted under the compressive load to bear radially inwardly toward the respective opposed portions of the surface of the ball-like portion, and a plurality of individual bearing plate elements on the semi-spherical surface of each of the bushings mounted for independent wear take-up relative movement, said bearing plate elements conforming to the curvature of the ball-like portion and being directly engageable with the surface of the ball-like portion under the resilient pressure of the supporting bushings, said bearing plate elements being arranged in separated generally annular series respectively engaging the ball-like portion on opposite sides of a circumferential line about the ball-like portion and with certain of the plate elements in end to end adjacency to others of the plate elements in such relation to one another cooperatively about the ball-like portion that each bearing plate element carried by one of the bushings works in opposition to the diametrically opposite bearing plate element carried by the other bushing and the ball-like portion is maintained under continuous uniform bearing pressure in spite of any wear that may occur in the plate elements.

2. A socket bearing as defined in claim 1 wherein each bushing carries from three to six individual bearing plates in spaced segmental relationship.

3. A ball and socket joint comprising a housing, a stud having a ball-like member at the end thereof, annular resilient bushing members in said housing substantially coaxial with said stud, each bushing member having a recess of partially spherical contour cooperating with the recess of the companion bushing member to receive the ball-like member therein, a plurality of relatively movable bearing sections of relatively hard material carried by each bushing member in its recess, said bushing members being radially loaded between said ball-like member and said housing to urge said bearing sections into bearing relation against said ball-like member to compensate for wear.

4. An annular resilient bushing member for a ball and socket type joint, the bushing member having a concave face defining a recess to receive a substantial segment of the ball-like portion of a ball stud member, and being cooperable with a like bushing member opposing it for between them resiliently bushing the ball-like portion, at least three concavo-convex bearing plates each bonded to said face and extending in the direction of the bushing member annulus axis, said bearing plates having wear take-up spaces therebetween and being individually self-adjustable for wear take-up in engagement with the ball portion of the stud independently of the companion bearing plates of the bushing member and also with respect to the bearing plates of the opposing bushing member.

MATTHEW P. GRAHAM.

REFERENCES CITED

The following references are of record in the file of this patent:

UNITED STATES PATENTS

| Number | Name | Date |
|---|---|---|
| 2,061,985 | Saurer | Nov. 24, 1936 |
| 1,989,116 | Strauss | Jan. 29, 1935 |
| 2,326,000 | Teeple | Aug. 3, 1943 |
| 1,771,615 | Brincil | July 29, 1930 |
| 1,759,430 | Benjamin | May 20, 1930 |
| 2,068,917 | Hufferd | Jan. 26, 1937 |
| 1,923,601 | Weaver | Aug. 22, 1933 |
| 2,361,025 | Graham et al. | Oct. 24, 1944 |
| 1,718,229 | Graham | June 25, 1929 |
| 1,909,100 | Geyer | May 16, 1933 |

OTHER REFERENCES

Engel, 268,117, published Alien Property Custodian, Apr. 27, 1943.